(12) United States Patent
Smith et al.

(10) Patent No.: US 7,765,305 B2
(45) Date of Patent: Jul. 27, 2010

(54) RETRY REQUEST OVERLOAD PROTECTION

(75) Inventors: Geoffrey R Smith, Mountain View, CA (US); David C. Clifford, Santa Clara, CA (US); Grant D Mohr, Burlingame, CA (US)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 11/100,756

(22) Filed: Apr. 7, 2005

(65) Prior Publication Data

US 2006/0230305 A1  Oct. 12, 2006

(51) Int. Cl.
*G06F 15/16* (2006.01)
(52) U.S. Cl. .................. 709/228; 709/232; 709/235; 709/203; 709/219
(58) Field of Classification Search .................. 709/228
See application file for complete search history.

(56) References Cited

U.S. PATENT DOCUMENTS

| | | | | |
|---|---|---|---|---|
| 5,636,230 A | * | 6/1997 | Marturano et al. | 714/748 |
| 5,701,427 A | * | 12/1997 | Lathrop | 709/237 |
| 6,065,052 A | * | 5/2000 | Van Loo | 709/224 |
| 6,070,242 A | * | 5/2000 | Wong et al. | 726/23 |
| 6,789,203 B1 | * | 9/2004 | Belissent | 726/22 |
| 6,954,443 B2 | * | 10/2005 | Forstadius et al. | 370/331 |
| 2002/0004838 A1 | * | 1/2002 | Hakenberg et al. | 709/231 |
| 2004/0064713 A1 | * | 4/2004 | Yadav | 713/193 |
| 2004/0087300 A1 | * | 5/2004 | Lewis | 455/412.2 |
| 2004/0156315 A1 | * | 8/2004 | Walls et al. | 370/235 |
| 2005/0021817 A1 | * | 1/2005 | Shimizu et al. | 709/231 |
| 2005/0066053 A1 | * | 3/2005 | McDysan | 709/243 |
| 2006/0168239 A1 | * | 7/2006 | Gauthier | 709/227 |
| 2006/0168504 A1 | * | 7/2006 | Meyer et al. | 714/799 |
| 2007/0242638 A1 | * | 10/2007 | Arkko et al. | 370/331 |

* cited by examiner

*Primary Examiner*—Joseph Thomas
*Assistant Examiner*—Eric W Shepperd
(74) *Attorney, Agent, or Firm*—Lee & Hayes, PLLC

(57) ABSTRACT

Retry request overload protection is described. A server system determines a client status based on retry requests received from the client. The client status may be used to determine whether to accept and/or process new retry requests received from the client and/or whether to transmit previously requested retry packets to the client. The client status may be based on a number of retry requests received from the client, a number of retry packets requested by the client, and/or a number of bytes of data associated with the retry requests received from the client. The client status may be updated periodically, enabling a non-favorable client status to be modified to a favorable client status if retry requests recently received from the client are within favorable limits.

16 Claims, 10 Drawing Sheets

RETRY REQUEST OVERLOAD PROTECTION

TECHNICAL FIELD

This invention relates to retry requests.

BACKGROUND

Several protocols exist for transmitting streaming media from a server to one or more client systems. One common protocol is TCP (transmission control protocol), which works well for transmitting media content that will not be presented immediately, or for which presentation quality can be compromised. The reason for this is that the TCP protocol has a built-in retry mechanism that automatically adjusts the data transfer rate based on lost packets. When transmitting streaming media content for immediate presentation to a user, automatic data transfer rate adjustments frequently lead to an under run scenario in which a client does not receive data quickly enough to enable immediate presentation of the data. For example, if a client device is receiving video data and experiences an under run, a single frame or a black screen may be displayed for some period of time until the client device receives enough data to resume presentation of the video.

To overcome the data under run problem that is common with the TCP protocol, streaming media systems often deliver media content using unreliable data communications protocols, such as UDP (user datagram protocol), which enables the system to maintain a particular data transfer rate that is not impacted by packet loss. In such an implementation, the client system is responsible for notifying the server of any packets that are not received by the client.

However, requiring a server to retransmit a packet each time a client reports a missing packet can lead to a network that is dominated by either a particular client that has lost a significant number of packets or a hostile attacker simulating a client requesting a large number of retries.

Accordingly, a need exists for techniques that enable a server system to track the status of a client to determine whether or not to respond to retry requests from that client.

SUMMARY

Retry request overload protection is described. A server assigns a status to a client based on retry requests received from the client. The status may then be used to determine whether or not to accept and/or process new retry requests from the client. The status may also be used to determine whether or not to transmit data packets to the client that were previously queued based on retry requests. The status may be based on any number of parameters, including, but not limited to, a number of retry requests received during a particular time period, a number of retry packets requested by the client during the time period, a number of bytes associated with the retry packets requested by the client during the time period, a number of received invalid retry requests (e.g., retry requests that are not formatted properly), receipt of retry requests associated with an inappropriate software version, and/or receipt of retry requests for data packets that are not currently available from the server. An unfavorable status may be reset to a favorable status when a period of time passes during which the client retry requests are within allowable limits.

DETAILED DESCRIPTION

The embodiments of retry request overload protection described below enable a server system to dynamically track the status of clients to determine whether or not to respond to retry requests received from a client. Specifically, at any point during a time interval, various parameters associated with a client may result in the client being marked as "unhealthy", meaning that new retry requests received from that client will not be processed, and that retry packets that have already been queued up for that client will not be sent. If the client reaches the end of a time interval with favorable parameters, then the client may be marked as "healthy", and retry requests for the client will again be fulfilled. Parameters that may be evaluated to determine a client status may include, but are not limited to, a number of retry requests received during a particular time period, a number of retry packets requested by the client during the time period, a number of bytes associated with the retry packets requested by the client during the time period, a number of received invalid retry requests (e.g., retry requests that are not formatted properly), receipt of retry requests associated with an inappropriate software version, and/or receipt of retry requests for data packets that are not currently available from the server.

The following discussion is directed to retry request overload protection. While features of retry request overload protection can be implemented in any number of different computing environments, they are described in the context of the following exemplary implementations.

Figure 1:
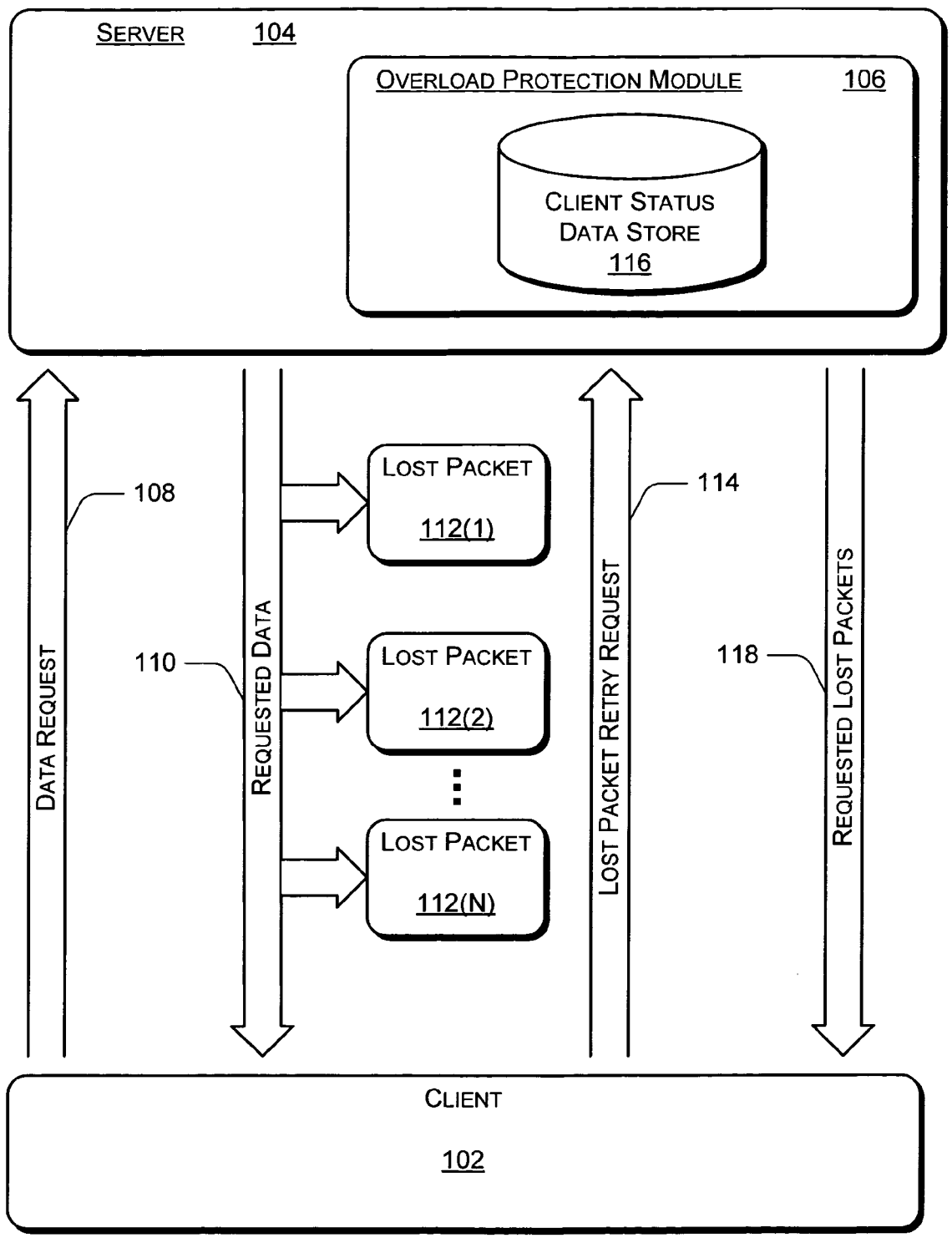
FIG. 1 is a block diagram that illustrates exemplary communications between a client and a server configured to perform retry request overload protection.

FIG. 1 illustrates communications that may occur between a particular client 102 and a server 104 that includes an overload protection module 106. In the illustrated example, client 102 sends a data request 108 to server 104. Server 104 responds to the request by sending the requested data 110 back to the client 102. For any number of reasons, data packets may be lost during the transmission of the requested data 110, represented in FIG. 1 by lost packets 112(1), 112(2), . . . , and 112(N). In an exemplary implementation, requested data 110 is transmitted using UDP (user datagram protocol) with a real-time protocol (RTP) layered on top. Such a protocol assigns locally unique values to enable reconstruction and reordering of the packetized data stream. RTP is configured to assign a unique sequence number to each packet, but it is recognized that alternate implementations may employ different protocols that support a different locally unique identification schemes for each packet, such as a timestamp, a global unique identifier (guid), etc., and the use of UDP and/or RTP is not intended as a limitation.

Client 102 receives the requested data 110, and identifies packets that are missing. Client 102 then sends a lost packet retry request 114 to server 104. Lost packet retry request 114 may specify one or more packets that client 102 did not receive. Upon receiving lost packet retry request 114, server 104 updates data associated with client 102 in client status data store 116 and determines whether or not the requested packets should be sent to client 102. If it is determined that the client 102 is healthy (e.g., has not submitted an excessive number of requests or requested an excessive amount of data in a given time interval), then server 104 transmits the requested lost packets 118 to client 102.

Figure 2:
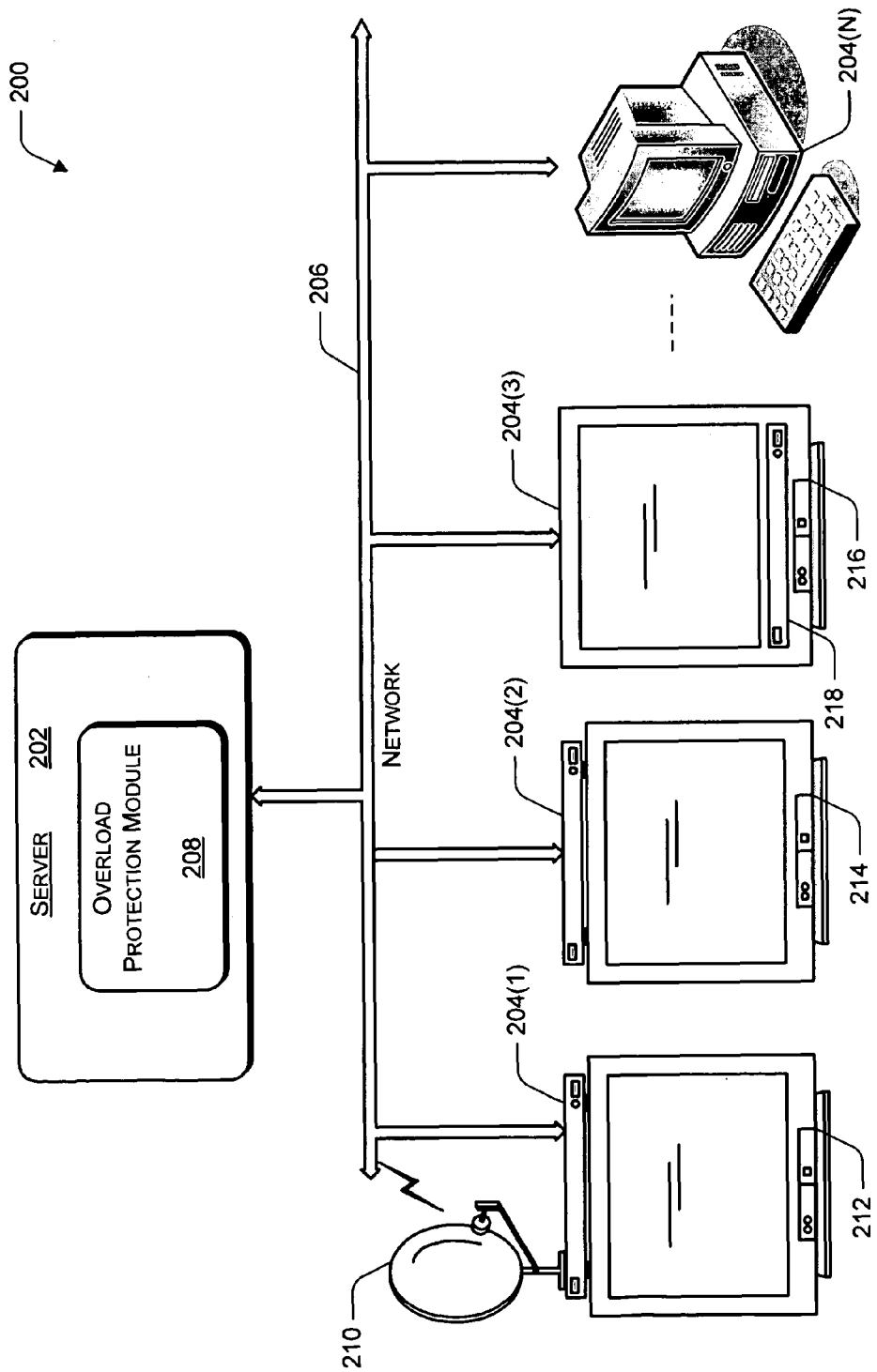
FIG. 2 is a pictorial diagram that illustrates an exemplary environment in which retry request overload protection may be implemented.

FIG. 2 illustrates an exemplary network environment 200 in which retry request overload protection may be implemented. Exemplary environment 200 is a media entertainment system that facilitates distribution of media content to multiple users. The environment 200 includes server 202, and multiple client devices 204(1), 204(2), 204(3), . . . , 204(N) coupled to the server 202 via a network 206.

Server 202 transmits media content to the multiple client devices 204(1), 204(2), 204(3), . . . , 204(N). In the described exemplary implementation, server 202 utilizes an overload protection module 208 to determine whether or not to fulfill specific lost packet retry requests received from client devices 204. Select components of an exemplary server 202 are described in further detail below with reference to FIG. 3.

In the described exemplary implementation, network 206 is an IP-based network that supports a UDP protocol. In alternate implementations, network 206 can include any type of two-way packet-based network, using any type of network topology and any network communication protocol, and can be represented or otherwise implemented as a combination of two or more networks.

Client devices 204 can be implemented in any number of ways. For example, a client device 204(1) receives content from a satellite-based transmitter via a satellite dish 210. Client device 204(1) is also referred to as a set-top box or a satellite receiving device. Client device 204(1) is coupled to a television 212 for presenting the media content received by the client device (e.g., audio and/or video data). Client device 204(1) may be configured to transmit data requests and/or retry requests over another network, such as a telephone network or IP-based network. Furthermore, in alternate implementations, this other network may provide a one-to-one communication path between the server and the client device 204(1) over which retry data packets may be sent. A particular client device 204 can be coupled to any number of televisions and/or similar devices that can be implemented to display or otherwise render content. Similarly, any number of client devices 204 can be coupled to a television. For example, a personal computer may be implemented as an additional client device capable of receiving data and/or media content and communicating with a set-top box, television, or other type of display device.

Client devices 204(2), 204(3), and 204(N) are also coupled to receive media content via network 206. Client device 204 (2) is an example of a set-top box, such as may be provided by a cable television provider, coupled to a television 214. Client device 204(3) is an example of a combination television 216 and integrated set-top box 218. In this example, the various components and functionality of the set-top box are incorporated into the television, rather than using two separate devices. The set-top box incorporated into the television may receive signals via a satellite dish (similar to satellite dish 210) and/or via network 206. Client device 204(N) is an example of a personal computer system configured to receive media content via network 206.

Network environment 200 is only one example environment in which retry request overload protection may be implemented. Alternate implementations are also considered, which may, for example, include a server for providing requested media content, and another server, which may be accessed by another network, for receiving and processing retry requests.

Figure 3:
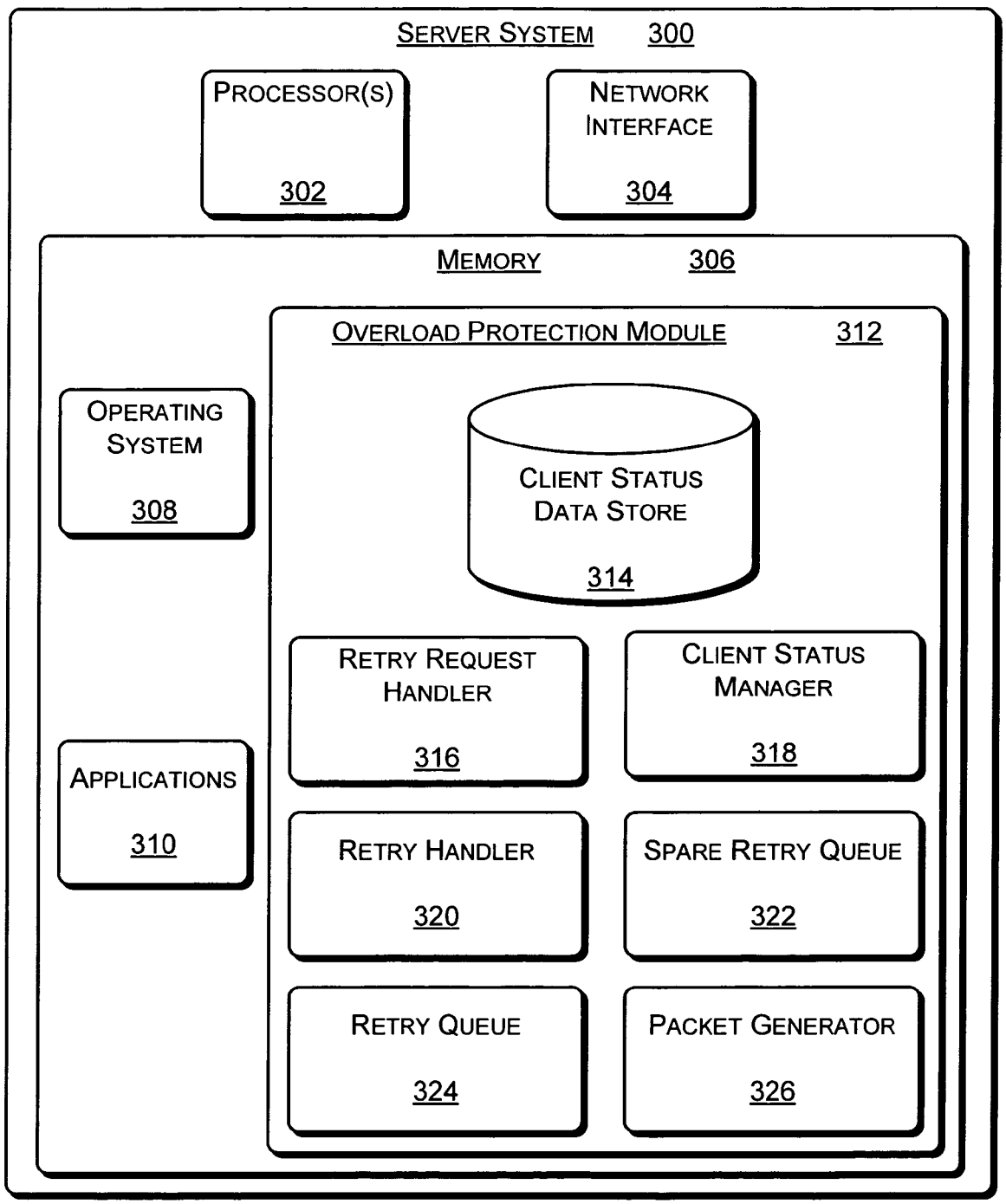
FIG. 3 is a block diagram that illustrates select components of an exemplary server configured to implement retry request overload protection.

FIG. 3 illustrates select components of an exemplary server system 300, configured to implement retry request overload protection. Server system 300 includes one or more processors 302, network interface 304, and memory 306. Network interface 304 enables communication between server system 300 and other computer systems, such as client systems, via a network such as the Internet.

Operating system 308, other applications 310, and overload protection module 312 are stored in memory 306 and executed on processor(s) 302. Components of overload protection module 312 may include, but are not limited to, client status data store 314, retry request handler 316, client status manager 318, retry handler 320, spare retry queue 322, retry queue 324, and packet generator 326.

Client status data store 314 maintains data based on retry requests received from clients. Exemplary values that may be maintained by client status data store 314 are described in further detail below with reference to FIG. 4. Retry request handler 316 receives a retry request from a client, checks the validity of the received request, updates the client's status in the client status data store 314, and determines whether the requested retry should be added to the retry queue 324. Client status manager 318 performs periodic maintenance on client status data store 314 by resetting values used to determine the status of various clients, setting client status to "healthy" for clients that have not recently submitted a significant number of retry requests (or have not recently requested a significant amount of retry data), and clearing records associated with clients from which no communication has been recently received.

Retry handler 320 obtains a packet from retry queue 324 and determines the status of the client to which the packet is addressed. If the client is healthy, then the retry handler 320 sends the packet. If the client is not healthy, then the packet is not sent, and is added to the end of the spare retry queue 322. Spare retry queue 322 is used to hold pre-allocated packets that can be added to the retry queue 324 as valid requests are received. Packet generator 326 generates a stream of packets to be transmitted. These packets may include, for example, media content that is requested by one or more clients.

Figure 4:
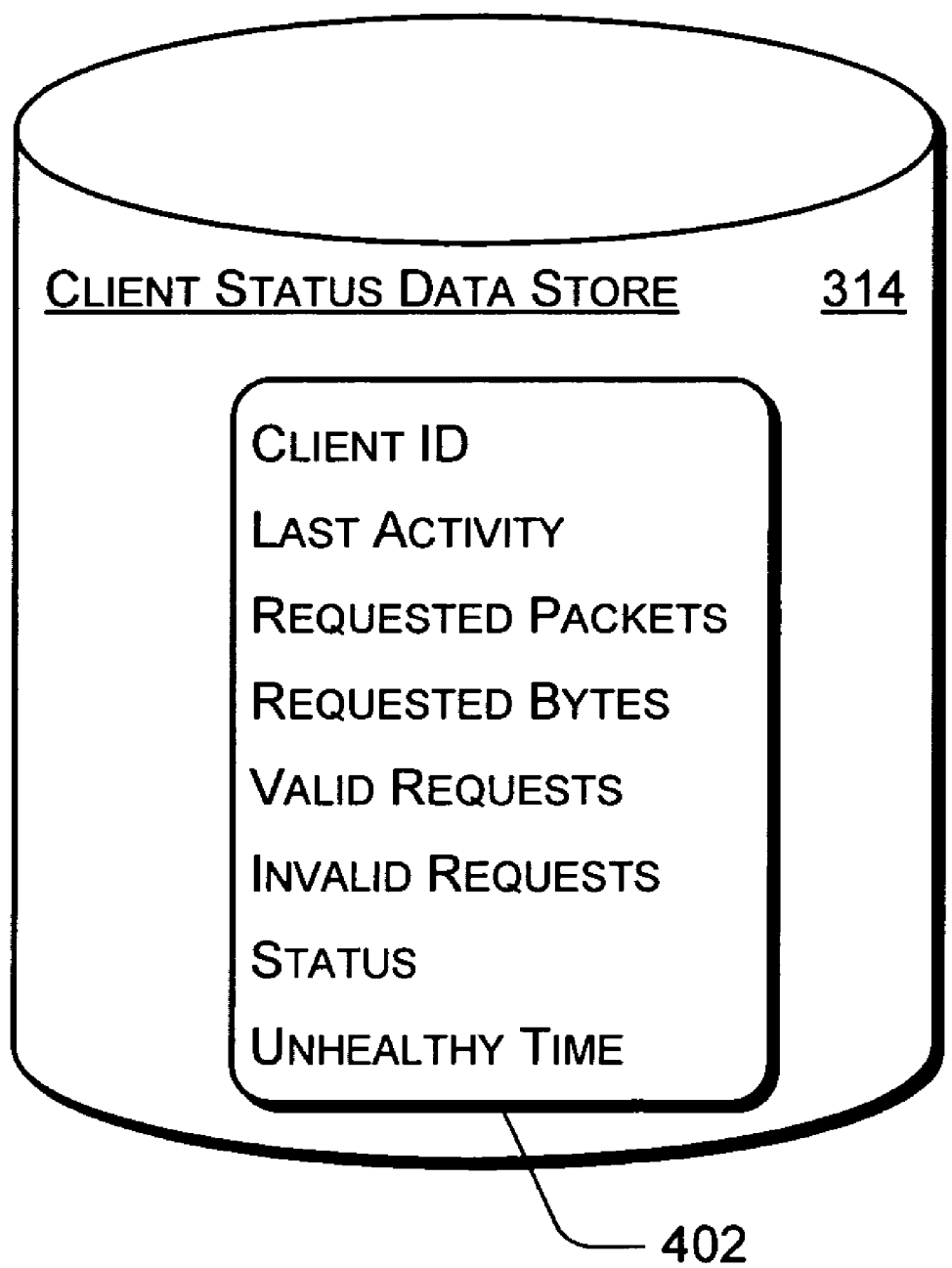
FIG. 4 is a block diagram that illustrates an exemplary data structure that may be maintained by the client status data store illustrated in FIG. 3.

FIG. 4 illustrates an exemplary data structure 402 that may be maintained by client status data store 314, shown in FIG. 3. In the illustrated example, for each client from which a retry request is received, client status data store 314 maintains a client ID, a last activity time, a number of requested packets, a number of requested bytes, a number of valid requests, a number of invalid requests, a status, and an unhealthy time. The client ID field of data structure 402 holds a value that uniquely identifies a client, such as an IP:port. The last activity field of data structure 402 holds a date/timestamp that indicates a date/time at which the last retry request was received from the client. The requested packets field of data structure 402 indicates a number of retry packets that have been requested by the client during the current time interval. The requested bytes field of data structure 402 indicates a number of bytes associated with the retry packets that have been requested by the client during the current time interval. The valid requests field of data structure 402 indicates a number of valid retry requests (each of which may have one or more associated packets) that have been received from the client during the current time interval. The invalid requests field of data structure 402 indicates a number of invalid retry requests that have been received from the client during the current time interval. A retry request may be determined to be invalid for any number of reasons, including, but not limited to, the retry request is incorrectly formatted, the retry request is formatted according to a different software version, the retry request is for data packets that are not maintained by the server, and so on. The status field of data structure 402 indicates a status (e.g., "healthy", "unhealthy", or "disabled") currently associated with the client. The unhealthy time field of data structure 402 indicates a date/time at which the status field was set to "unhealthy".

Methods for retry request overload protection may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

FIGS. 5-8 illustrate exemplary methods for implementing retry request overload protection. FIGS. 5-8 are specific examples of retry request overload protection, and are not to be construed as limitations. Furthermore, it is recognized that various embodiments of retry request overload protection may implement any combination of the methods illustrated in FIGS. 5-8 or any combination of portions of the methods illustrated in FIGS. 5-8.

Figure 5:
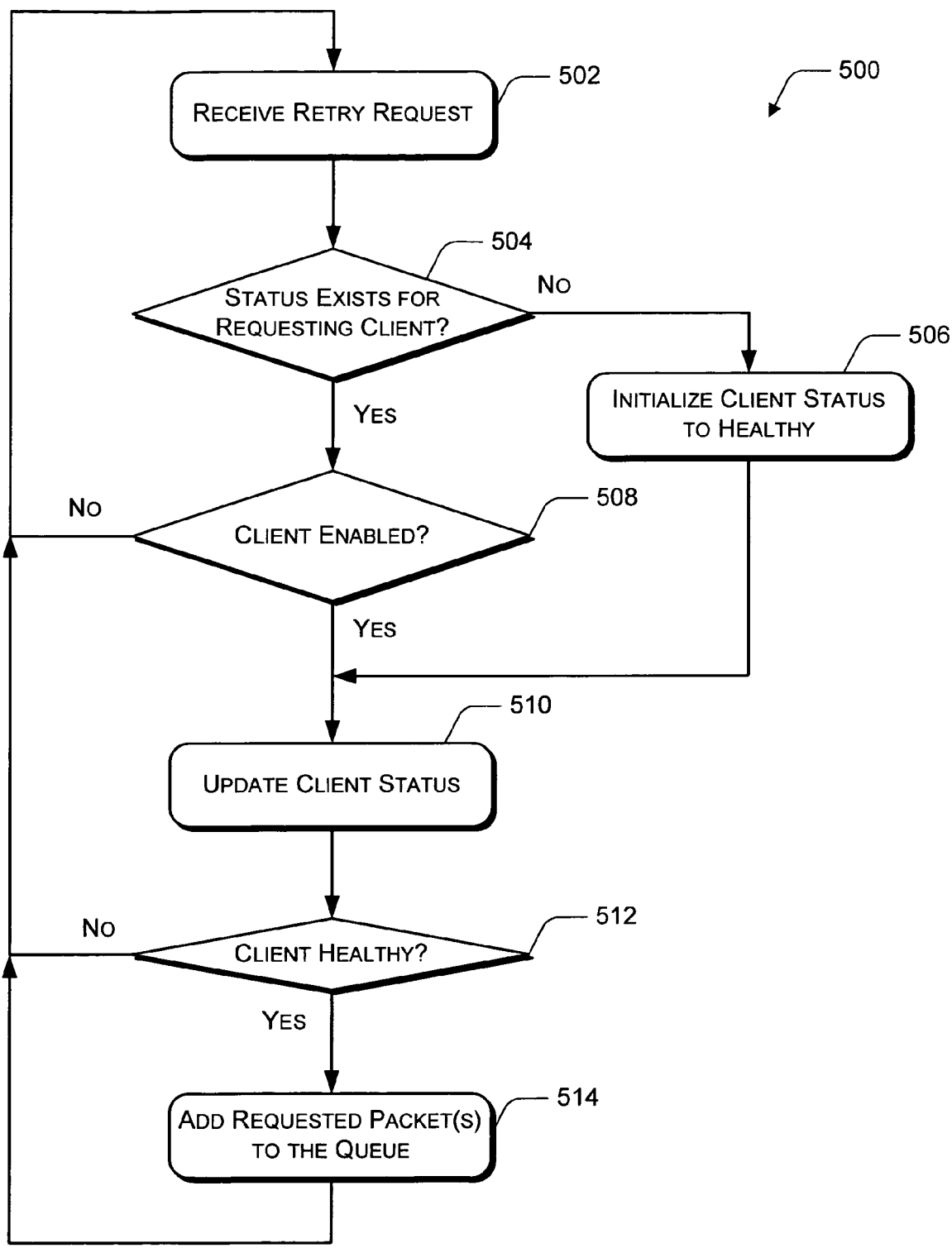
FIG. 5 is a flow diagram that illustrates an exemplary method for retry request overload protection.

FIG. 5 illustrates an exemplary method 500 for an embodiment of retry request overload protection. The order in which the method is described is not intended to be construed as a limitation, and any number of the described method blocks can be combined in any order to implement the method. Furthermore, the method can be implemented in any suitable hardware, software, firmware, or combination thereof.

At block 502, a server receives a retry request from a client. For example, referring to FIG. 1, server 104 receives lost packet retry request 114 from client 102.

At block 504, the server determines whether or not a status is known for the client from which the retry request was received. For example, referring to FIG. 3, retry request handler 316 may query client status data store 314 based on a client ID associated with the received retry request.

If a status record associated with the requesting client is not found (the "No" branch from block 504), then at block 506, the server initializes the client status to "healthy". For example, referring to FIG. 4, a new record is created in client status data store 314 with client ID set to a unique identifier associated with the requesting client; last activity set to the current date/time; requested packets set to zero; requested bytes set to zero; valid requests set to zero; invalid requests set to zero; status set to "healthy"; and unhealthy time set to null. Processing then continues as described below with reference to block 510.

At block 508, after identifying a status record associated with the requesting client (the "Yes" branch from block 504), the server examines the status record in client status data store 314 associated with the requesting client. If the client status is "disabled", then, as indicated by the "No" branch from block 508, no further processing is performed.

On the other hand, if the client is enabled (e.g., the client status is "healthy" or "unhealthy") (the "Yes" branch from block 508), then at block 510, the server updates the client status. An exemplary method for updating the client status is described in further detail below with reference to FIG. 6.

At block 512, the server determines whether or not the client status is "healthy". For example, the server examines the status record in client status data store 314 associated with the requesting client. If the client status is "unhealthy", then, as indicated by the "No" branch from block 512, no further processing is performed.

On the other hand, if the client status is "healthy" (the "Yes" branch from block 512), then at block 514, the requested packet(s) are added to the retry queue. For example, referring to FIG. 3, for each requested packet, a spare packet may be obtained from spare retry queue 322, populated with the requested packet data, and added to retry queue 324.

Figure 6:
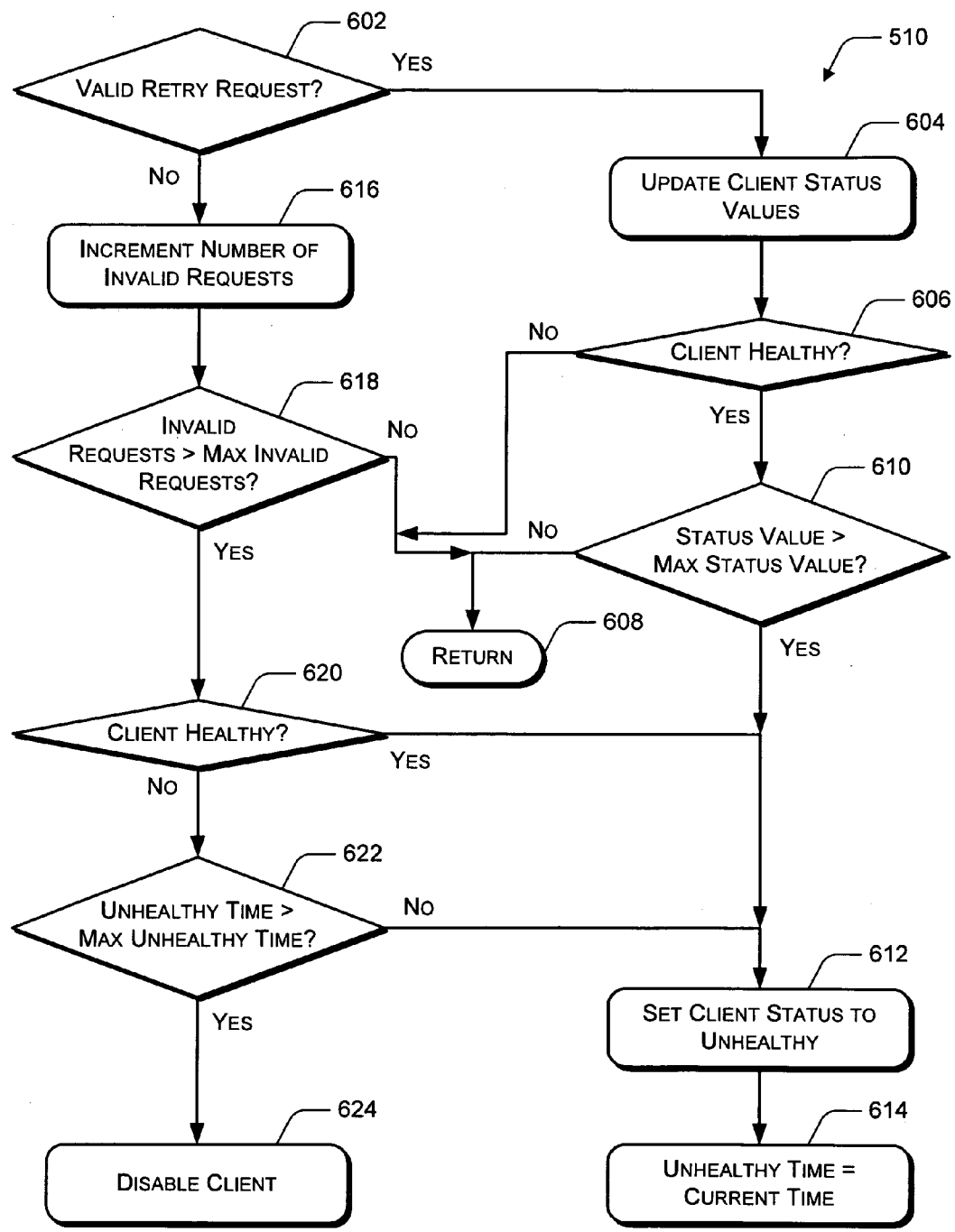
FIG. 6 is a flow diagram that illustrates an exemplary method for updating a client status in support of retry request overload protection as illustrated in FIG. 5.

FIG. 6 illustrates an exemplary method 510 for updating a client status in support of retry request overload protection. The order in which the method is described is not intended to be construed as a limitation, and any number of the described method blocks can be combined in any order to implement the method. Furthermore, the method can be implemented in any suitable hardware, software, firmware, or combination thereof.

At block 602, a server determines whether or not a received retry request is valid. For example, the server may examine the format of the request. Furthermore, the server may confirm that the requested number of packets and/or requested number of bits associated with the request are less than an allowed threshold value. That is, a server may enforce that a client cannot request more than a pre-specified number of packets and/or bits in a single retry request. Validity of a received retry request may also be based, for example, on whether or not the requested data packet(s) are currently maintained by the server.

If the request is determined to be valid (the "Yes" branch from block 602), then at block 604, the server updates one or more client status values based on the received retry request. For example, retry request handler 316 may update a last activity value, a requested packets value, a requested bytes value, and a valid requests value associated with the client in client status data store 314.

At block 606, the server determines whether or not the client from which the request was received is healthy. For example, retry request handler 320 may query client status data store 314 for a status value associated with the client from which the retry request was received. If it is determined that the client from which the request was received is not healthy (the "No" branch from block 606), then at block 608, updating of the client status is completed.

On the other hand, if it is determined that the client from which the retry request was received is healthy (the "Yes"

branch from block 606), then at block 610, the server determines whether any of the client status value exceed maximum thresholds associated with those values. For example, retry request handler 316 may determine whether a requested packets value exceeds a request packets threshold value; whether a requested bytes value exceeds a requested bytes threshold value; and whether a valid requests value exceeds a valid requests threshold value. If the client status values are within the specified thresholds (the "No" branch from block 610), then at block 608, updating of the client status is completed.

If any of the client status values are determined to exceed specified thresholds (the "Yes" branch from block 610), then at block 612, the server sets the client status to unhealthy. For example, retry request handler 316 updates a status value associated with the client in client status data store 314 to "unhealthy". At block 614, the server sets an unhealthy time value to the current time, thereby recording the time at which the client was determined to be unhealthy.

If at block 602 the request is determined to be invalid (the "No" branch from block 602), then at block 616, the server increments a number of invalid requests associated with the client from which the invalid retry request was received. For example, retry request handler 320 may increment by one an invalid requests value associated with the client in client status data store 314.

At block 618, the server determines whether or not a number of invalid retry requests received from the client exceeds a maximum number of allowed invalid retry requests. If the server determines that the number of invalid retry requests received from the client does not exceed a maximum number of allowed invalid retry requests (the "No" branch from block 618), then at block 608, updating of the client status is complete.

On the other hand, if the server determines that the number of invalid retry requests received from the client exceeds a maximum number of allowed invalid retry requests (the "Yes" branch from block 618), then at block 620, the server determines whether a healthy status is currently associated with the client. If it is determined that the client currently has a healthy status (the "Yes" branch from block 620), then processing continues as described above with reference to block 612 and 614.

On the other hand, if it is determined that the client currently has an unhealthy status (the "No" branch from block 620), then at block 622, the server determines whether or not the client has had an unhealthy status for an excessive period of time. For example retry request handler 316 may calculate a length of time that the client has had an unhealthy status by subtracting an unhealthy time value associated with the client in client status data store 314 from the current time. The result is then compared with a maximum unhealthy time. If it is determined that the client has not had an unhealthy status for an excessive period of time (the "No" branch from block 622), then processing continues as described above with reference to blocks 612 and 614.

On the other hand, if it is determined that the client has had an unhealthy status for an excessive period of time (the "Yes" branch from block 622), then at block 624, the client is disabled. For example, retry request handler 316 sets a status value associated with the client in client status data store 314 to "disabled".

In the described exemplary implementation, once a client is disabled, the client remains disabled indefinitely, or until some user intervention is performed to manually reset the client status to a value other than "disabled". Alternatively, a disabled client may be enabled after some predetermined period of time (e.g., one day, one week, one month, etc.).

Figure 7:
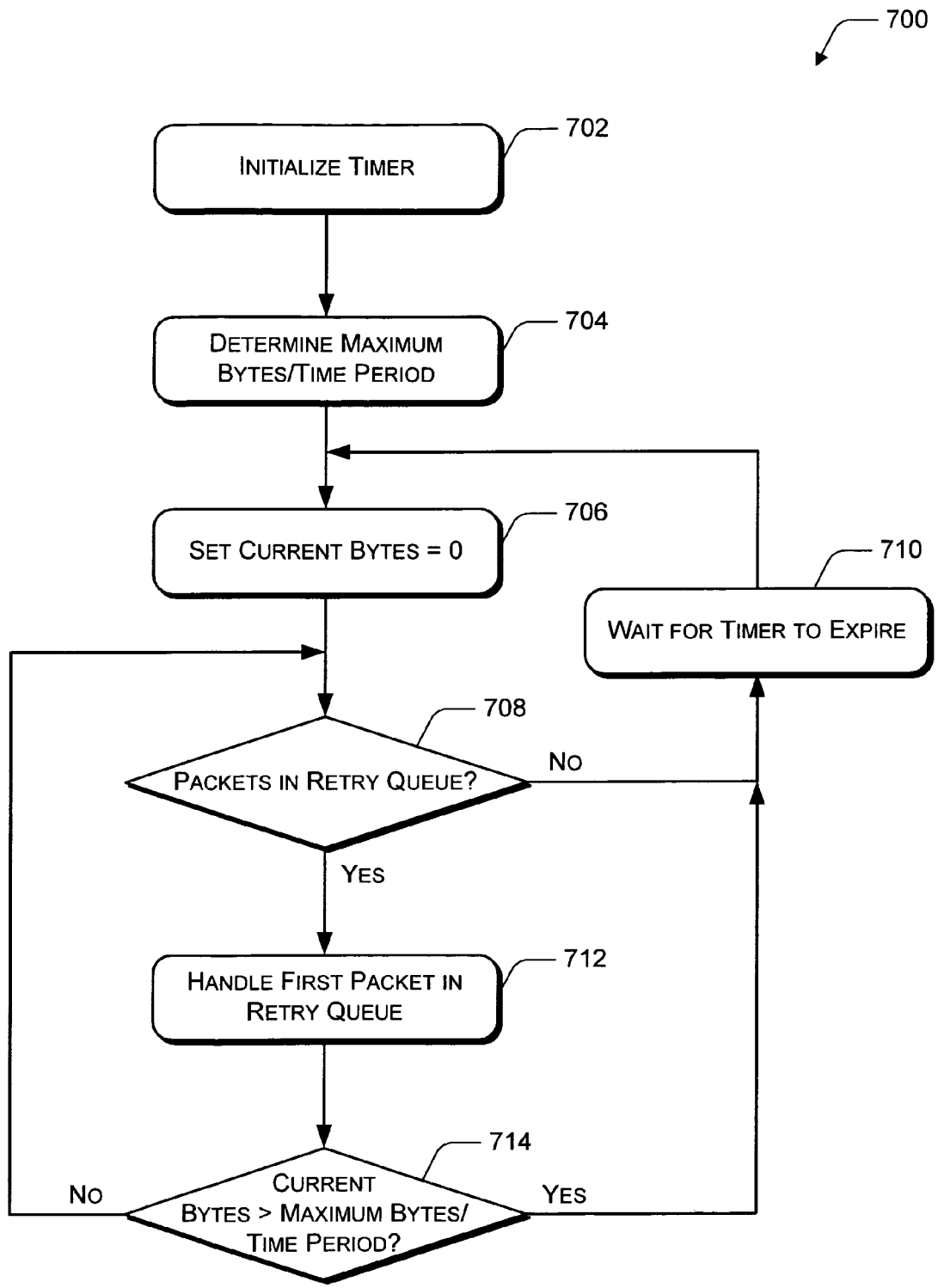
FIG. 7 is a flow diagram that illustrates an exemplary method for retry request overload protection.

FIG. 7 illustrates an exemplary method 700 for an embodiment of retry request overload protection. The order in which the method is described is not intended to be construed as a limitation, and any number of the described method blocks can be combined in any order to implement the method. Furthermore, the method can be implemented in any suitable hardware, software, firmware, or combination thereof.

At block 702, a server initializes a timer to expire at preset periodic intervals. At block 704, the server determines a maximum number of bytes to be transmitted as retry packets during any one of the periodic intervals. This value is used to limit the amount of data that is transmitted by the server in response to retry requests.

At block 706, the server sets a current bytes value equal to zero, indicating that, for the current time interval, no data has been transmitted.

At block 708, the server determines whether or not there are any retry packets in a retry queue, such as retry queue 324 shown in FIG. 3. If there are no retry packets in the retry queue (the "No" branch from block 708), then at block 710, the server waits for the timer to expire, indicating the start of a new time interval. When the timer expires, or if the timer has already expired, processing continues as described above with reference to block 706.

When it is determined that there are one or more retry packets in the retry queue (the "Yes" branch from block 708), then at block 712, the server handles the first packet in the retry queue. An exemplary method for handling the packet is described in further detail below, with reference to FIG. 8.

At block 714, the server compares the number of bytes that have been sent during the current time interval to the maximum number of allowed bytes per time interval. If the current number of bytes sent is less than the maximum number of allowed bytes (the "No" branch from block 714), then processing continues as described above with reference to block 708.

On the other hand, if the current number of bytes sent is greater than the maximum number of allowed bytes (the "Yes" branch from block 714), then at block 710, the server waits for the timer to expire, indicating the start of a new time interval. When the timer expires, or if the timer has already expired, processing continues as described above with reference to block 706.

Figure 8:
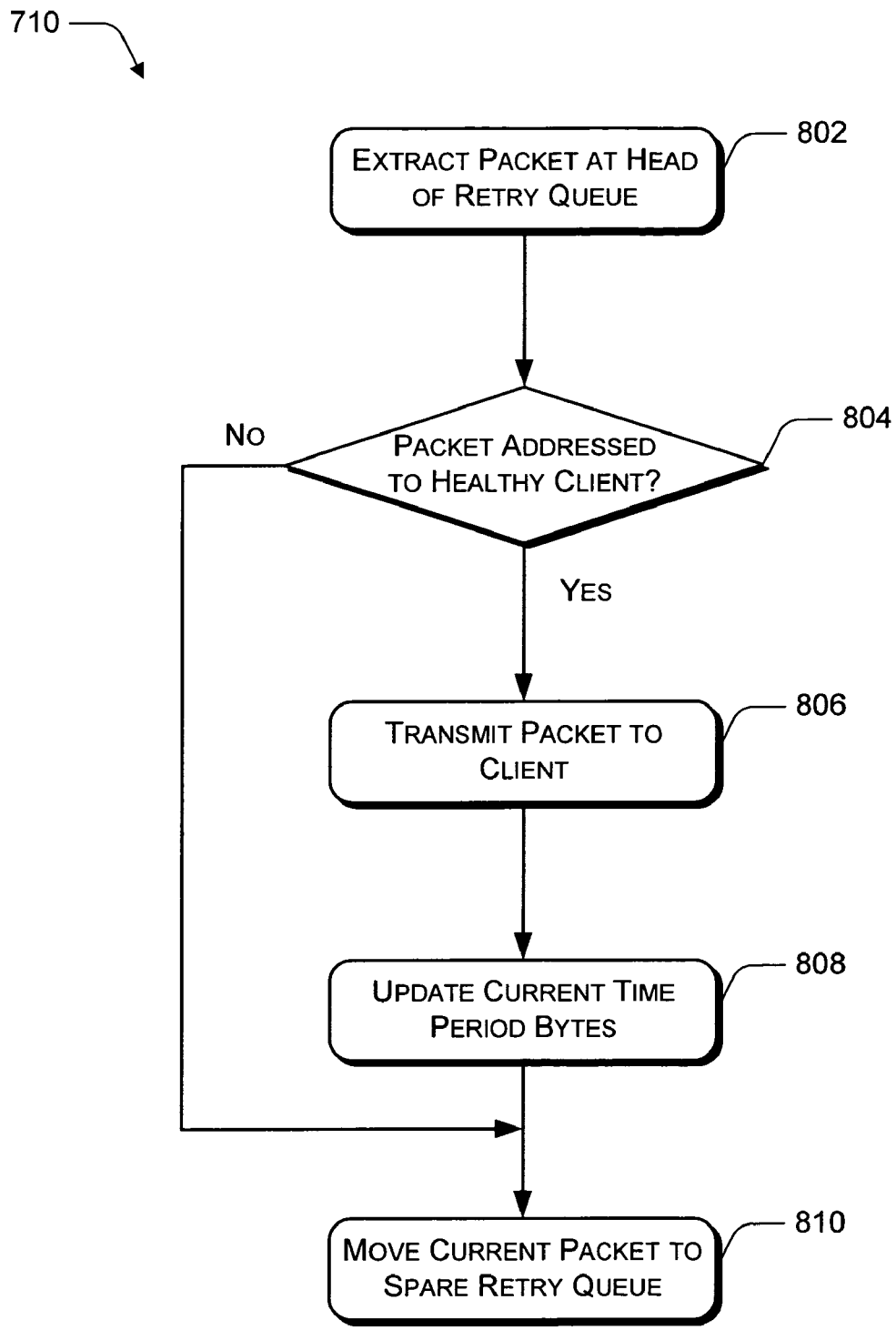
FIG. 8 is a flow diagram that illustrates an exemplary method for handling a retry packet while implementing retry request overload protection, as illustrated in FIG. 7.

FIG. 8 illustrates an exemplary method 710 for handling a retry packet identified in a retry queue. The order in which the method is described is not intended to be construed as a limitation, and any number of the described method blocks can be combined in any order to implement the method. Furthermore, the method can be implemented in any suitable hardware, software, firmware, or combination thereof.

At block 802, a retry packet is extracted from the head of a retry queue. For example, referring to FIG. 3, retry handler 320 obtains the first retry packet from retry queue 324.

At block 804, the retry handler determines whether or not the packet is addressed to a healthy client. For example, retry handler 320 may query client status data store 314 to determine the status associated with the client to which the retry packet is addressed.

If the retry packet is addressed to a client with a status other than "healthy" (the "No" branch from block 804), then at block 810, the retry packet is moved to the end of a spare retry queue (or otherwise discarded). In the described implementation, a spare retry queue is used to store pre-allocated packets. In an alternate implementation, a single retry queue may be used and packets may be allocated and de-allocated as needed.

If it is determined that the retry packet is addressed to a healthy client (the "Yes" branch from block 804), then at block 806, the server transmits the packet to the client to which the packet is addressed.

At block 808, the server updates a number of bytes that have been transmitted during the current time period by incrementing a current bytes value by the size (in bytes) of the transmitted retry packet. (The current bytes value referred to in FIG. 8 is the same as the current bytes value referred to in FIG. 7.)

At block 810, the server moves the retry packet to the end of the spare retry queue.

Figure 9:
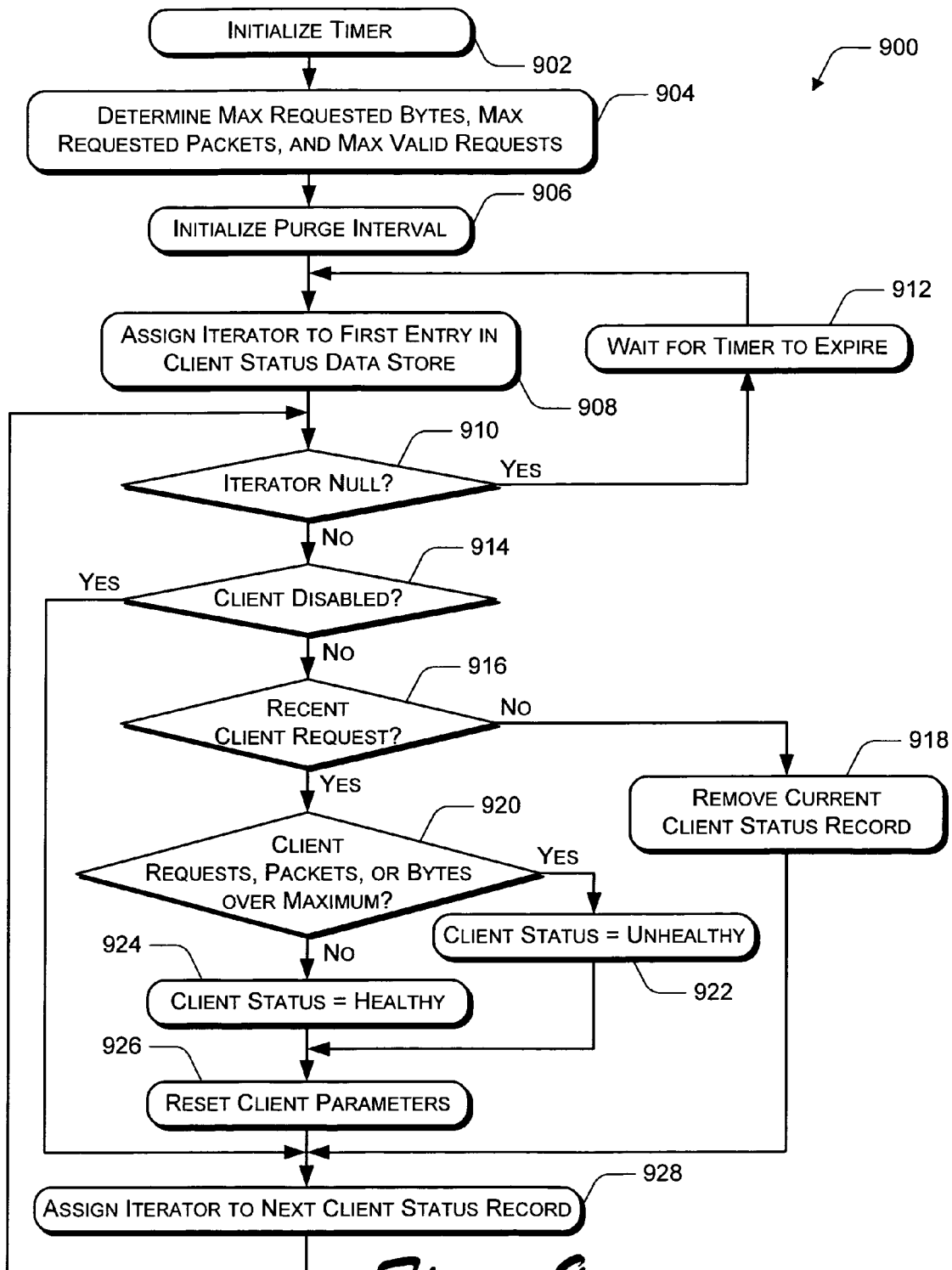
FIG. 9 is a flow diagram that illustrates an exemplary method for managing client status data associated with retry request overload protection.

FIG. 9 illustrates an exemplary method 900 for managing client status data in support of retry request overload protection. The order in which the method is described is not intended to be construed as a limitation, and any number of the described method blocks can be combined in any order to implement the method. Furthermore, the method can be implemented in any suitable hardware, software, firmware, or combination thereof.

At block 902, a server initializes a timer to expire at preset periodic intervals.

At block 904, the server determines a maximum number of allowed requested bytes, a maximum number of allowed requested packets, and a maximum number of allowed valid requests, each to be applied per client and per time interval. That is, a particular client is limited in the number and size of requests submitted to the server during any given time interval. In various implementations, one or more of these values may be pre-specified or dynamically determined based, for example, on currently available network bandwidth.

At block 906, the server determines a purge interval that indicates a minimum period of client retry request inactivity, after which an entry in a client status data store associated with the client may be purged.

At block 908, the server assigns an interator to the first entry in a client status data store. For example, a pointer may by allocated and assigned to a first record in a database, hash table, or other type of data structure that maintains client status records, such as client status data store 314, shown in FIGS. 3 and 4.

At block 910, the server determines whether or not the interator is pointing to a null value, indicating that the client status data store is currently empty or that the iterator has moved past the last entry. If the iterator is pointing to a null value (the "Yes" branch from block 910), then at block 912, the server waits for the timer to expire before continuing processing as described above with reference to block 908.

If it is determined that the iterator is pointing to a non-null value (the "No" branch from block 910), then at block 914, the server determines whether or not the client associated with the current record is disabled. For example, referring to FIGS. 3 and 4, client status manager 318 checks the value of the status field for the record to which the iterator is currently pointing. If it is determined that the client associated with the current record is disabled (the "Yes" branch from block 914), then processing continues as described below with reference to block 928.

If it is determined that the client associated with the current record is not disabled (the "No" branch from block 914), then at block 916, the server determines whether the client associated with the current client status record has submitted any recent requests to the server. For example, referring to FIGS. 3 and 4, client status manager 318 determines an amount of time that has passed since the last request was received from the client by subtracting the client last activity value from the current time. Client status manager 318 then compares the result to the purge interval.

If the purge interval is greater than the amount of time since the client's last request, indicating that there have been no recent requests from this client (the "No" branch from block 916), then at block 918, the server removes the current client status record. For example, client status manager 318 removes the current entry from the client status data store. Processing then continues as described below with reference to block 928.

On the other hand, if the purge interval is less than the amount of time since the client's last request, indicating that there has been at least one recent request from this client (the "Yes" branch from block 916), then at block 920, the server determines whether or not the current client has exceeded any of the maximum allowable values. For example, client status manager 318 compares a maximum number of valid requests value to the valid requests value in the client status record; a maximum number of requested packets value to the requested packets value in the client status record; and a maximum number of requested bytes value to the requested bytes value in the client status record.

If any of the client status values exceed the allowable maximum value (the "Yes" branch from block 920), then at block 922, the server sets the client status to unhealthy. For example, client status manager 318 sets the client status value to "unhealthy" and sets the unhealthy time value to the current time. Processing then continues as described below with reference to block 926.

On the other hand, if none of the values associated with the client exceed the allowable maximum values (the "No" branch from block 920), then at block 924, the server sets the client status to healthy. For example, client status manager 318 sets the client status value to "healthy".

At block 926, the server resets the client parameters that are used to determine the client status. For example, client status manager 318 resets the requested packets value to zero, sets the requested bytes value to zero, sets the valid requests value to zero, sets the invalid requests value to zero, and sets the unhealthy time value to null.

At block 928, the server moves the iterator to the next client status record. For example, client status manager 318 moves the iterator to the next entry in the client status data store, and processing continues as described above with reference to block 910.

Figure 10:
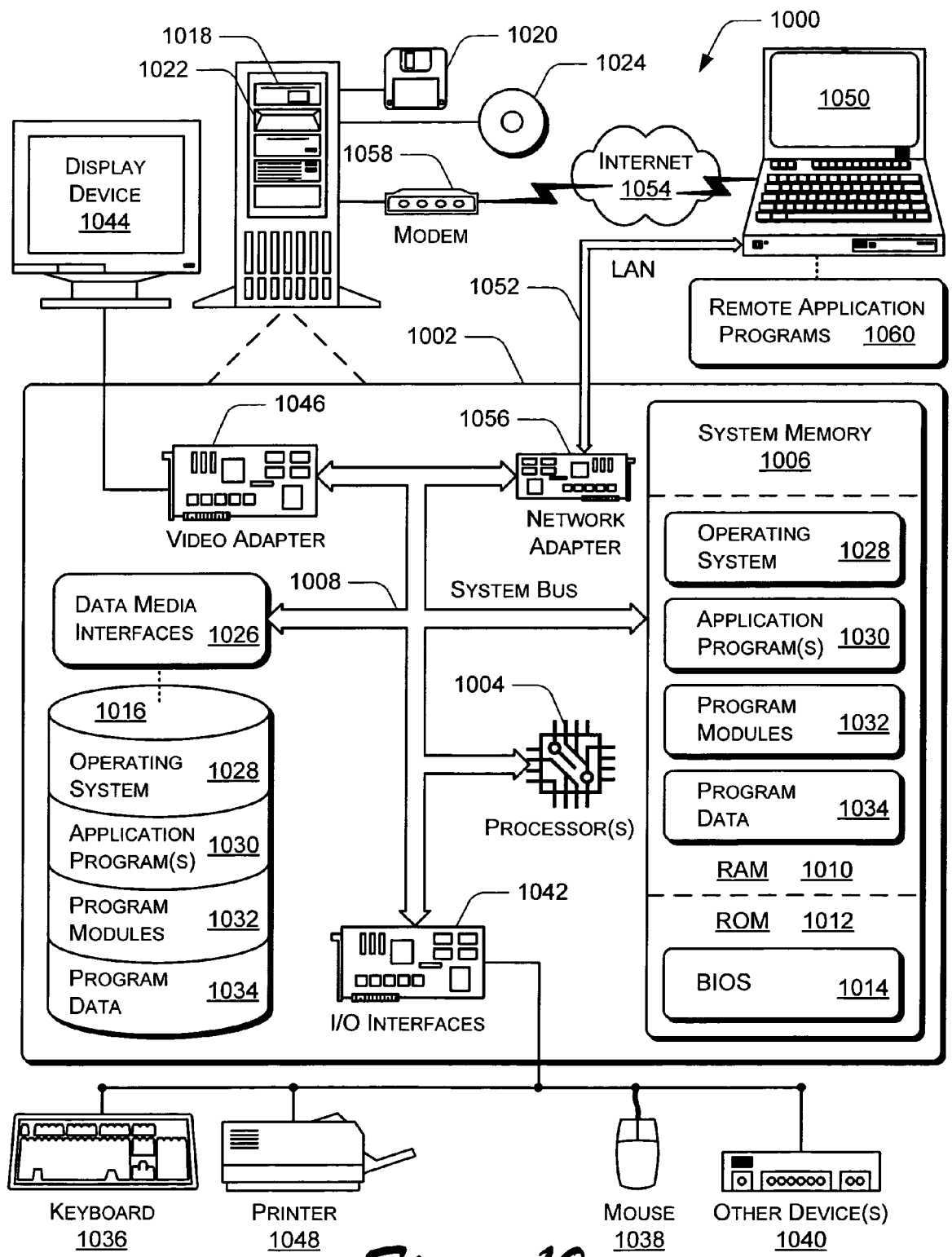
FIG. 10 is a pictorial/block diagram of exemplary computing systems, devices, and components in an environment in which retry request overload protection may be implemented.

FIG. 10 illustrates an exemplary computing environment 1000 within which retry request overload protection systems and methods, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the retry request overload protection systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 1004 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048 which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 1004 of the computing device 1002.

Although embodiments of retry request overload protection have been described in language specific to structural features and/or methods, it is to be understood that the subject of the appended claims is not necessarily limited to the specific features or methods described. Rather, the specific features and methods are disclosed as exemplary implementations of retry request overload protection.

The invention claimed is:

1. A system comprising:
a client status data store configured to maintain a client status based on retry requests received from a client;
a retry queue configured to hold retry data packets to be sent to clients; and
a retry request handler configured to:
receive a retry request from the client;
determine whether the client status is known for the client by querying the client status data store;
in an event that the client status is not found in the client status data store, initialize the client status to healthy;
in an event that the client status is disabled, ignore the retry request;
in an event that the client status is enabled including healthy and unhealthy, update the client status based on a set of data values,
if the client status is healthy for responding, add a data packet associated with the retry request to the retry queue; and
if the client status is unhealthy for responding, ignore the retry request,
wherein the set of data values comprises:
a number of valid retry requests received from the client;
a number of invalid retry requests received from the client;
a number of retry packets requested by the client; and
a number of retry bytes requested by the client.

2. The system as recited in claim 1, further comprising a retry handler configured to:
obtain a data packet from the retry queue, the data packet addressed to the client;
evaluate a client status associated with the client;
in an event that the client status is healthy for responding, initiating that the data packet be transmitted to the client; and
in an event that the client status is unhealthy for responding, discard the data packet without transmitting the data packet to the client.

3. The system as recited in claim 1, further comprising a client status manager configured to:
determine that a specified time interval has passed;
determine a current client status based on a data value generated from retry requests recently received from the client; and
reset the data value.

4. A method, comprising:
receiving, by a server configured to handle retry requests from multiple clients, a retry request from a client;
evaluating, by the server, a client status associated with the client;
in an event that the client status is not found in a client status data store, initializing, by the server, the client status to healthy;
in an event that the client status is disabled, ignoring, by the server, the retry request;
in an event that the client status is enabled including both healthy and unhealthy, updating, by the server, the client status;
in an event that the client status is healthy for responding, responding, by the server, to the retry request; and
in an event that the client status is unhealthy for responding, ignoring, by the server, the retry request,
updating the client status based on a set of data values, the set of data values comprising:
a number of valid retry requests received from the client;
a number of invalid retry requests received from the client;
a number of retry packets requested by the client;
a number of retry bytes requested by the client; and
a unique value that identifies the client.

5. The method as recited in claim 4, wherein responding, by the server, to the retry request comprises:
identifying, by the server, a data packet associated with the retry request; and
adding, by the server, the data packet to a retry request queue.

6. The method as recited in claim 4, further comprising, upon receiving the retry request, updating, by the server, the client status based on characteristics of the retry request.

7. The method as recited in claim 6, wherein updating, by the server, the client status comprises:
incrementing, by the server, a number of valid retry requests associated with the client by one;
in an event that the number of valid retry requests associated with the client is greater than a valid retry request threshold value, setting, by the server, the client status to indicate that retry requests from the client are not to be processed; and
in an event that the number of valid retry requests associated with the client is not greater than the valid retry request threshold value, setting, by the server, the client status to indicate that retry requests from the client may be processed.

8. The method as recited in claim 6, wherein updating, by the server, the client status comprises:
incrementing, by the server, a number of invalid retry requests associated with the client by one;
in an event that the number of invalid retry requests associated with the client is greater than an invalid retry request threshold value, setting, by the server, the client status to indicate that retry requests from the client are not to be accepted; and
in an event that the number of invalid retry requests associated with the client is not greater than an invalid retry request threshold value, setting, by the server, the client status to indicate that retry requests from the client may be accepted.

9. The method as recited in claim 6, wherein updating, by the server, the client status comprises:
determining, by the server, a number of packets associated with the retry request;
incrementing, by the server, a number of requested retry packets associated with the client by the number of packets associated with the retry request;
in an event that the number of requested retry packets associated with the client is greater than a requested retry packets threshold value, setting, by the server, the client status to indicate that retry requests from the client are not to be accepted; and
in an event that the number of requested retry requests associated with the client is not greater than a requested retry packets threshold value, setting, by the server, the client status to indicate that retry requests from the client may be accepted.

10. The method as recited in claim 6, wherein updating, by the server, the client status comprises:
determining, by the server, a number of bytes associated with the retry request;

incrementing, by the server, a number of requested retry bytes associated with the client by the number of bytes associated with the retry request;

in an event that the number of requested retry bytes associated with the client is greater than a requested retry bytes threshold value, setting, by the server, the client status to indicate that retry requests from the client are not to be accepted; and in an event that the number of requested retry bytes associated with the client is not greater than a requested retry bytes threshold value, setting, by the server, the client status to indicate that retry requests from the client may be accepted.

11. The method as recited in claim 4, further comprising:

determining, by the server, that a specified time interval has passed; and resetting, by the server, a data value used to determine the client status.

12. The method as recited in claim 11, further comprising, setting the client status to a healthy value for responding in an event that prior to being reset, the data value represents healthy retry request behavior by the client.

13. One or more computer storage media comprising computer-readable instructions which, when executed, cause a computer system to perform a method, the method comprising:

identifying a retry packet addressed to a client;

evaluating a client status associated with the client;

in an event that the client status is not found in a client status data store, initializing a client status to healthy;

in an event that the client status is disabled, ignoring the retry packet; in an event that the client status is enabled including both healthy and unhealthy, updating the client status;

in an event that the client status is healthy for responding, transmitting the retry packet to the client; and in an event that the client status is unhealthy for responding, discarding the retry packet, updating the client status based on a set of data values, the set of data values comprising:

a number of bytes of data requested as retry packets by the client;

a number of valid retry requests received from the client;

a number of invalid retry requests received from the client;

a number of retry packets requested by the client; and a unique value that identifies the client.

14. The one or more computer storage media as recited in claim 13, wherein the unique value that identifies the client comprises an IP address of the client.

15. The one or more computer storage media as recited in claim 13, further comprising:

determining that a specified time interval has passed; and resetting a data value used to determine the client status.

16. The one or more computer storage media as recited in claim 15, further comprising resetting the client status to a healthy value for responding in an event that prior to being reset, the data value represents favorable retry request behavior by the client.

* * * * *